United States Patent [19]
Schmidt et al.

[11] 3,711,855
[45] Jan. 16, 1973

[54] SATELLITE ON-BOARD SWITCHING UTILIZING SPACE-DIVISION AND SPOT BEAM ANTENNAS

[75] Inventors: William G. Schmidt; Nobuhiko Shimasaki, both of Rockville, Md.

[73] Assignee: Communications Satellite Corporation

[22] Filed: Oct. 15, 1969

[21] Appl. No.: 866,554

[52] U.S. Cl. .............................343/100 SA, 343/854
[51] Int. Cl. ...............................................H04b 7/00
[58] Field of Search ..........343/100 SA, 100 CS, 854; 325/14; 250/199

[56] References Cited

UNITED STATES PATENTS

| | | | |
|---|---|---|---|
| 3,406,401 | 10/1968 | Tillotson | 343/100 SA |
| 3,500,406 | 3/1970 | Parker | 343/100 CS |
| 3,384,894 | 5/1968 | Clark | 343/100 CS |
| 3,245,081 | 4/1966 | McFarland | 343/854 X |

*Primary Examiner*—Carl D. Quarforth
*Assistant Examiner*—J. M. Potenza
*Attorney*—Sughrue, Rothwell, Mion, Zinn & Macpeak

[57] ABSTRACT

An on-board processing system is disclosed for a communications satellite which employs spot beam antennas. Since each spot beam antenna in general, sees only one ground station, this allows the same frequencies to be used by all stations. Using this space-division technique, the on-board processing involves the switching from origin grouping of incoming communications signals to destination grouping of outgoing communications transmissions. This switching is accomplished by means of a distribution frame. The distribution frame includes storage registers which logically control the partitioning of the voice-channel segments and the switching times. The contents of all of the storage registers can be changed by command.

24 Claims, 10 Drawing Figures

INVENTORS
WILLIAM G. SCHMIDT
NOBUHIKO SHIMASAKI
BY Sughrue, Rothwell, Mion, Zinn & MacPeak
ATTORNEYS INVENTORS
WILLIAM G. SCHMIDT
NOBUHIKO SHIMASAKI
BY Sughrue, Rothwell, Mion, Zinn & MacPeak
ATTORNEYS

SATELLITE ON-BOARD SWITCHING UTILIZING SPACE-DIVISION AND SPOT BEAM ANTENNAS

BACKGROUND OF THE INVENTION

1. Field of the Invention

This invention relates generally to communications satellites, and more particularly to an on-board switched multiple-access system for millimeter-wave satellites.

2. Description of the Prior Art

The role of the present commercial communications satellite in a satellite communication network can be described as a celestial multiple-access microwave repeater. Conventional communications satellites employ multiple transponders and global-coverage antennas. Frequency division multiplex techniques are used with each station transmitting a group of carriers. A restriction which is implicit in this system is that no two stations may utilize the same frequency simultaneously.

As the spectrum allocations in the 4 to 6 GHz region, which is the band currently employed in communication satellite systems, become less available and more precious, there is considerable interest in the possibilities afforded by the use of the millimeter-wave region for satellite communications. While the spectrum allocation potentially available in this region is significantly greater than that of the 4 to 6 GHz region, there are a number of severe technical problems associated with millimeter-wave communications satellite systems. For example, signals at these high frequencies tend to be severely attenuated by rain. This, however, may be overcome by using geographic diversity techniques. On the other hand, there are some advantages associated with millimeter wave systems; for example, antennas designed for use in this region are smaller and more amenable to the development of highly directive spot-beam patterns. A communications satellite employing such multiple spot-beam antennas for both receive and transmit functions would be capable of effective reuse of portions of the frequency spectrum that would not be available if only global coverage antennas were used by the satellite. Thus, such a satellite would have the advantage of frequency spectrum conservation through frequency reuse. This becomes more important as communications traffic increases.

SUMMARY OF THE INVENTION

It is therefore an object of the present invention to provide a multiple-access satellite communications technique which enables optimal use to be made of the highly directive properties of millimeter wave technology to achieve a saving in utilization of the frequency spectrum.

It is a further object of this invention to provide a communications satellite on-board switching system which employs the above technique and has the additional advantage of enhancing the system capacity on a per-station basis.

According to the present invention, the foregoing and other objects are attained by providing an on-board satellite switching system which is operative for switching from origin grouping of up-link signals to destination grouping of down-link signals. The switching system employs a distribution frame which is capable of changing both the destination grouping and the time allocations of assigned voice channel segments. The information for controlling the distribution frame is obtained from the satellite command system.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
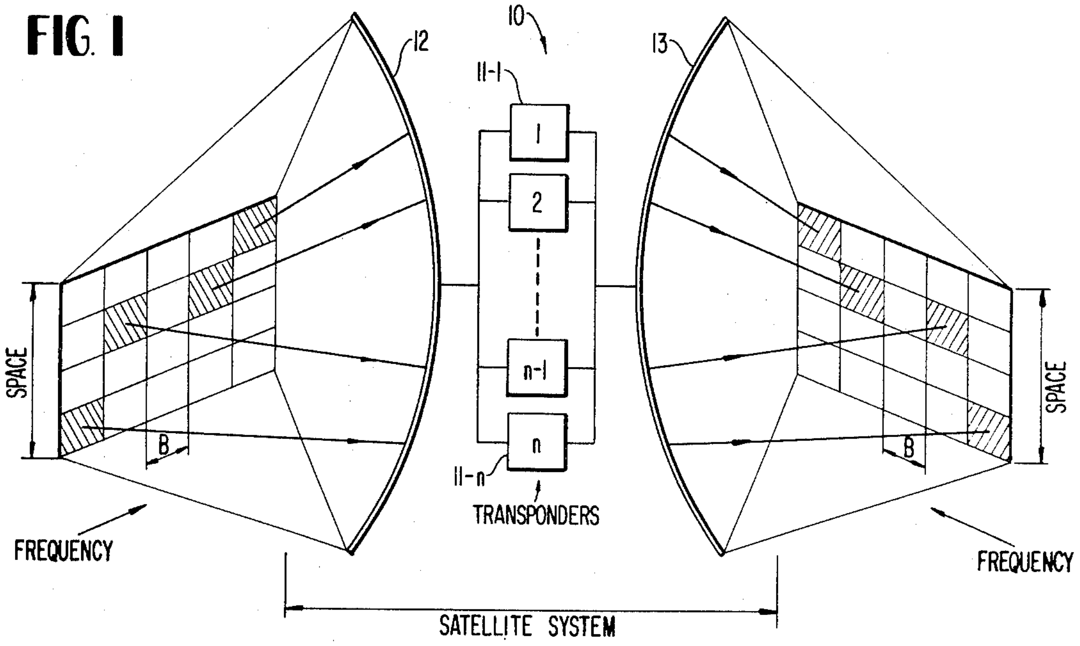
FIG. 1 is a generalized schematic diagram which illustrates the general frequency spectrum utilization plan of a conventional multiple-transponder satellite which employs global-coverage antennas.

Referring now to the drawings and more particularly to FIG. 1, there is shown a conventional multiple-transponder satellite 10. In simplicity it is assumed that the satellite employs a plurality of transponders 11–1 through **11–*n* and that there are n stations in the network. However, it is, of course, not necessary to have as many transponders as stations in the network since several stations can operate through a single transponder. Up-link communications signals are received by a global-coverage receiving antenna 12, while down-link signals are transmitted by a similar transmitting antenna 13. Since global coverage antennas are used, frequency reuse is impossible with this conventional system. The rectangular grids adjacent each of the antennas 12 and 13** graphically illustrate the space and frequency distribution of the ground stations. The shaded areas in the grids represent individual ground stations, and the system requirements are such that no two stations may simultaneously overlap in frequency. Assuming that there are *n* stations corresponding to the n transponders in the satellite, and that each of these stations utilizes a transmit bandwidth B, then the total communications satellite bandwidth must be $2Bn$. The factor 2 is required because the transmitting and receiving bandwidths cannot overlap.

Figure 2:
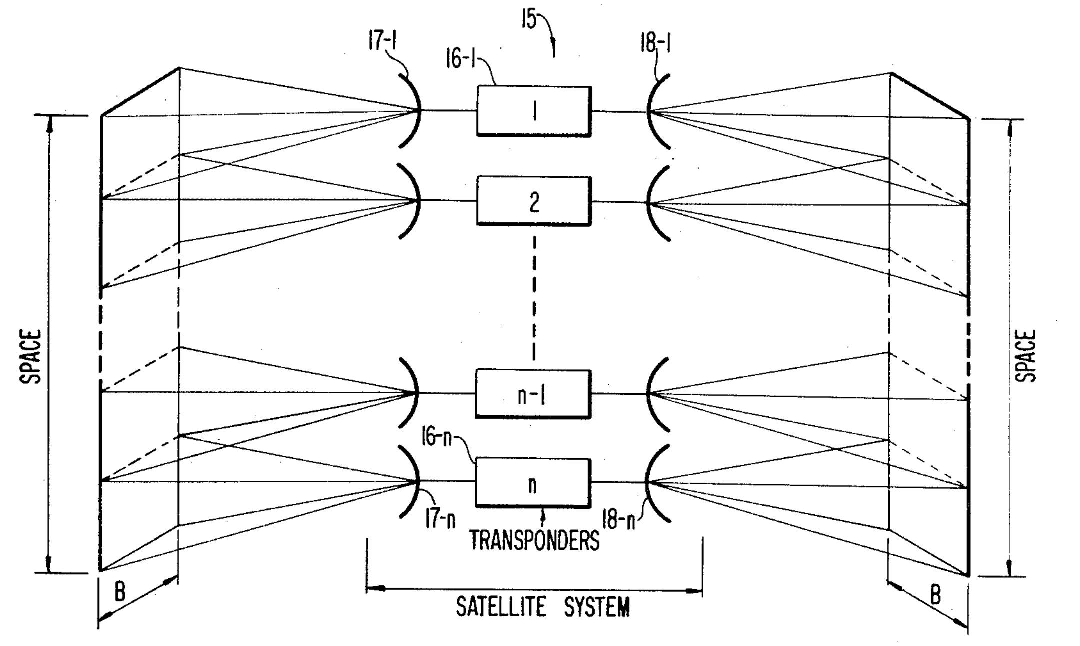
FIG. 2 is a generalized schematic diagram which shows the general plan of a satellite which has highly directive receive and transmit spot-beam antennas such that the spectrum can be effectively space-divided and reused.

FIG. 2 shows the general plan of a communications satellite 15 which employs highly directive receive and transmit spot beam antennas. The satellite 15 includes a plurality of transponders 16–1 to **16–*n* as before. There are, however, separate spot-beam receive antennas 17–1 to 17–*n* and separate spot-beam transmit antennas 18–1 to 18–$n$** associated with each of the transponders. As illustrated by the columnar grids adjacent the receiving and transmitting antennas, this satellite system permits the spectrum to be effectively space-divided and the frequencies reused. Note that the total bandwidth utilized by the satellite is now 2B, yielding an $n$-fold saving of the spectrum over the global-coverage antenna satellite.

Figure 3:
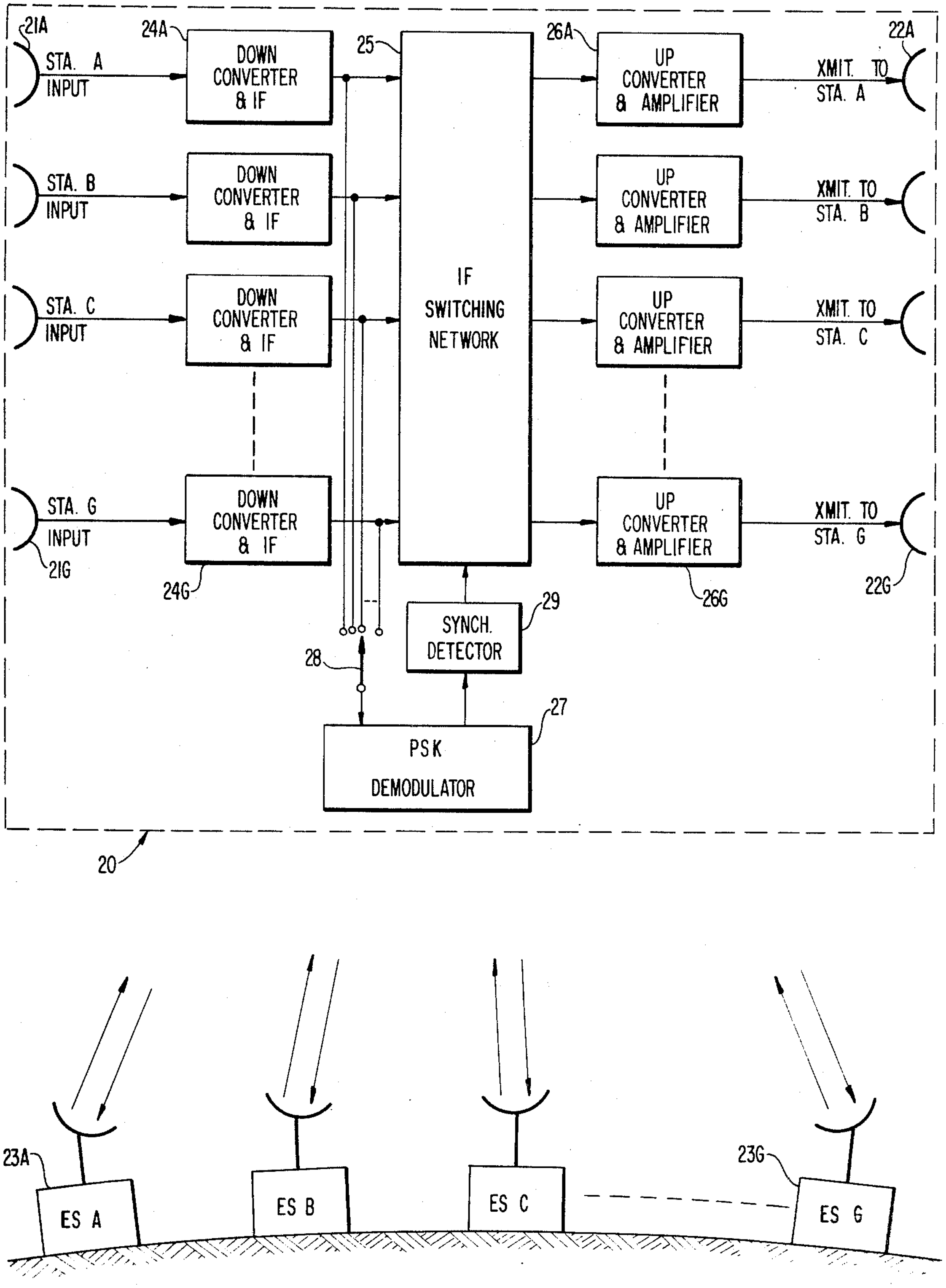
FIG. 3 is a block diagram of the overall communications satellite system employing on-board satellite switching according to the present invention.

Since the use of spot-beams for both transmit and receive functions on the satellite generally implies that each ground station has its own individual transmit/receive antenna on the satellite, and because traffic is routed at the satellite from one station to another, an on-board satellite distribution system is required. FIG. 3 shows a communications satellite system which employs satellite on-board switching. The satellite 20 includes spot-beam receive antennas 21A through 21G and transmit spot-beam antennas 22A through 22G. These are pointed at respective ground stations 23A to 23G, each ground station being spaced from the others by a sufficient distance to enable it to communicate with its corresponding spot-beam antennas on the satellite 20 without interference from other ground stations. The up-link signals received by the spot-beam antennas 21A to 21G are connected to respective down converters and IF subassemblies 24A to 24G. The outputs of the down converters and IF subassemblies are each then connected to an IF switching network 25 which comprises the distribution subunit of the subject invention. Switching network 25 is operative to switch from origin grouping to destination grouping of voice-channel segments. For example, ground station A may transmit a plurality of time divided or sequential voice-channel segments each of which is destined for a different ground station B, C, and G. All of these voice-channel segments from ground station A are received by the spot-beam antenna 21A. It is then the function of the switching network 25 to appropriately distribute each of these voice-channel segments to the proper spot-beam transmitting antennas 22B, 22C, and 22G. The same operations hold true with respect to transmissions from the other ground station, for example, so that the output of the switching network to the spot-beam transmitting antenna 22A, for example, comprises a group of voice-channel segments intended for that station from ground stations B, C, and G. The several outputs of the switching network 25 are connected to the several spot-beam transmitting antennas 22A to 22G by way of respective up converters 26A to 26G.

One of the problems of communications systems using highly-directive spot-beam antennas is that the transmitting station generally cannot monitor its own transmissions as they are reradiated by the satellite antenna since the return path signal is too far down in power level. Since operation of time division multiple-access systems of the type to which the present application relates requires very accurate burst synchronization, some method of synchronization must be provided. Previous burst synchronization schemes rely upon comparison by a local station of the time of arrival of a reference signal with the time of arrival of a signal transmitted by the local station. Such comparisons then determine what corrections must be made to the transmit timing of the local station to achieve synchronization. These comparisons and corrections form the basis of a closed-loop system, an essential part of which is the use of the return-path signal. In order to solve this problem for time division multiple-access use of spot-beams, the satellite switching system in synchronized with a reference ground station and itself distributes synchronization information back to each of the stations of origin. To this end, FIG. 3 shows a PSK demodulator 27 connected to receive the output from one of the down converter and IF subassemblies 24A to 24G by way of a selector switch 28. Selector switch 28 is provided since any one of the several ground stations can act as the reference station. The output of the PSK demodulator 27 is connected to a synchronization detector 29 which in turn controls the synchronization of the switching network 25.

In the operation of the system shown in FIG. 3, each ground station transmits a continuous carrier signal, the modulation of which is PCM/TDM/CPSK/TDM. In other words, the voice channel inputs are pulse-code-modulation (PCM) encoded and time-division-multiplexed (TDM) into a single multi-channel bit stream which enters a coherent phase shift-keyed (CPSK) modulator to modulate the IF signal. Because these PSK modulations are, in addition, time-grouped by destination and have a definite frame period, this super-modulation may be described as TDM as well. The transmissions of all stations are frame-synchronized as they enter their respective satellite receive spot beam antennas. Following down conversion and amplification, these signals enter the satellite distribution subsystem 25 which acts as a time-division-switching demultiplexer in that all the traffic intended for a particular destination is then sequentially directed toward the output amplifier and antenna for that destination. Finally, receiving station receives and demodulates the reconstituted carrier directed to it which is still PCM/TDM/CPSK/TDM modulated, but the super-time-division multiplex is, of course, now source-oriented rather than destination-oriented as it was in the up-link.

From the preceding description, it can be appreciated that several synchronization subunits must be provided in the system. First, the several ground stations transmissions must be frame-synchronized when entering their respective satellite spot beam antennas. Second, the on-board switching unit must be frame synchronized to perform its time-division switching function properly. Third, the CPSK demodulator at each ground station must recover the carrier and clock signal of each TDM segment separately since they will vary from segment to segment. Finally, there must be some indication within each TDM segment as to where the first bit of the first channel time-slot is located.

Figure 4A:
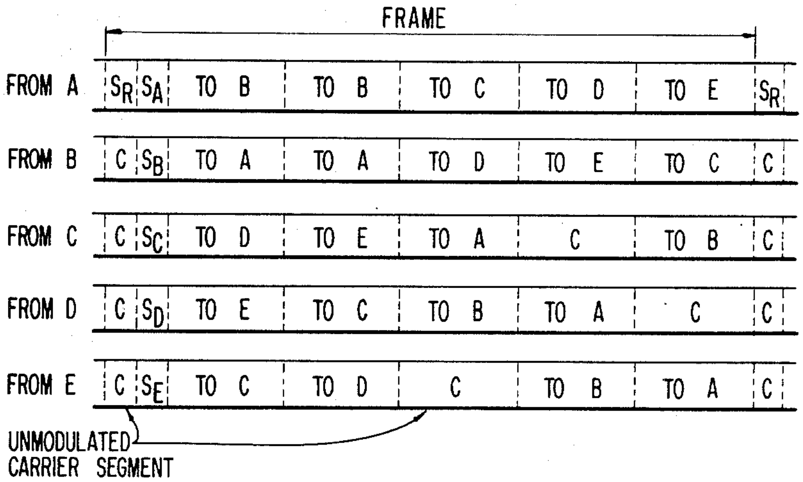
FIGS. 4A and 4B illustrate the transmit and receive signal formats, respectively, employed in the system shown in FIG. 3.
Figure 4B:
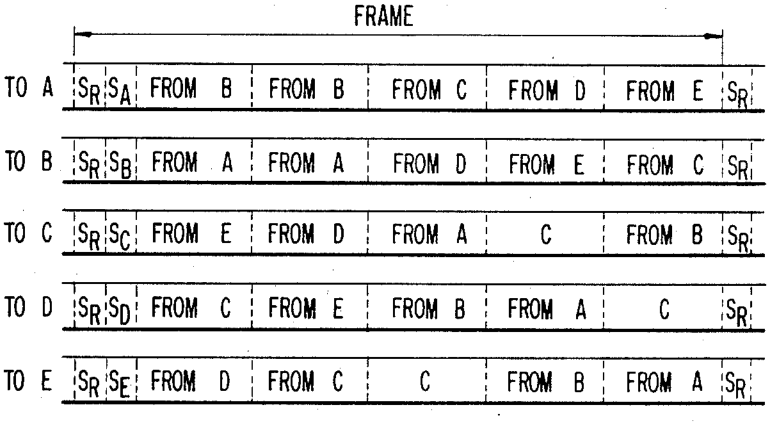

To accomplish this synchronization, the up-link format shown in FIG. 4A is employed and results in the down-link format of FIG. 4B. Each line in FIG. 4A represents transmission from a single station and occurs simultaneously in time with the others. In explaining the transmit format, it is assumed that station A is acting as a reference station for frame synchronization. Because of this, the first segment of ground station A's transmission format is a short period which contains, primarily, a code word for correlation detection by all stations and the satellite. This period is denoted by $S_R$.

During this part of the frame, non-reference stations may transmit unmodulated carrier as indicated by C. The next segment of the format is also used for synchronization. In this case, all the stations transmit their own unique station identification code words. This is denoted in FIG. 4A by $S_A$ to $S_E$. Actually, the reference station is not required to do this, but in the interest of uniformity it is done here.

Up to this point in the transmit format, no voice channel information has been transmitted. Following the two short synchronization segments, the destination-oriented time-division groupings of voice channel data starts. In the example shown in FIG. 4A, these segments are of equal length (and capacity). However, if a particular station has more traffic for another station than the capacity of a segment, two or more segments may be alloted. For example, as shown in the Figure, station A has two segments allotted to station B. Similarly, station B has two segments allotted to station A. It will be noted that, insofar as voice traffic is concerned, the number of channels sent from one station to another will equal the number of return channels from that station. However, it is not necessary that all segments be of equal length.

On board the satellite, the switching subsystem is synchronized to receive the frame by the reference synchronization segment of station A's transmission. RF switches in the satellite are programmed, again by on board logic, first to send the reference station's synchronization segment simultaneously to all of the output amplifiers. The RF switches then connect the respective inputs directly to the output spot beams (through the appropriate amplifiers and converters) corresponding to the transmitting station for the station identification segments so that, for example, station B receives the identification code word of station B. Thus, each station receives, in succession, the reference segment of station A's transmission followed by identification code word. This time-divided return of the outgoing signals solves the spot-beam synchronization problem. Each station, by receiving both the reference code word and its own code word, can control their transmissions to maintain frame synchronization.

Thereafter, the switching subsystem 25 directs the non-overlapping traffic segments for each station to the satellite output spot beam associated with that particular station. This is shown in FIG. 4B. Thus, all segments that were destined for station A, for example, in the transmit format shown in FIG. 4A, are now grouped together in FIG. 4B.

Figure 5A:
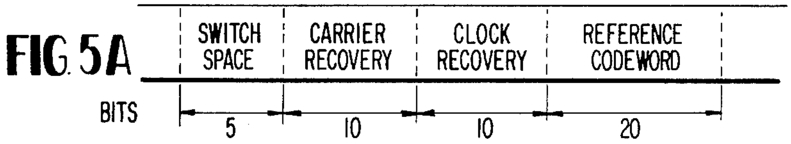
FIGS. 5A, 5B, and 5C illustrate in greater detail selected portions of the signal formats shown in FIGS. 4A and 4B.
Figure 5B:
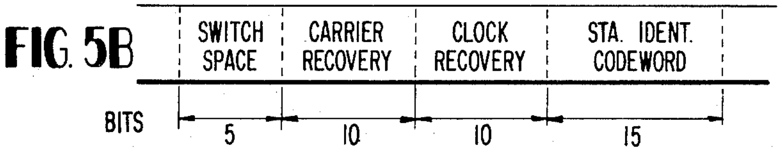
Figure 5C:
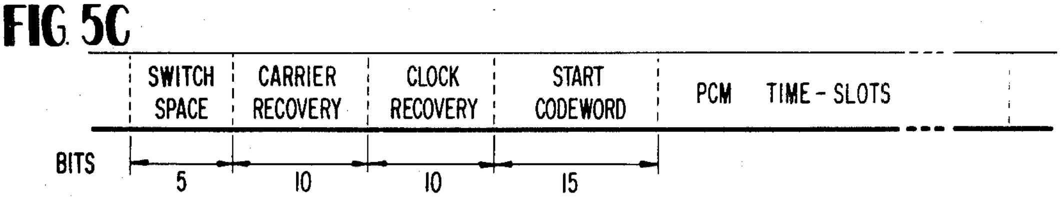

FIGS. 5A, 5B, and 5C illustrate the details of the segment format. There are two types of segments used in the system. The first is the frame synchronization segments such as $S_R$ and $S_i$, which may be referred to generally as the frame reference signal and station identification signal, respectively and the second is the voice channel segments. FIGS. 5A and 5B show the reference synchronization segment and the individual station synchronization segment, respectively, while FIG. 5C shows the voice channel segment. Since all segments are, in general, relatively incoherent with respect to each other in carrier and clock signals, the initial portion of each segment must be devoted to a short preamble for carrier and clock recovery. As illustrated in the Figures, this amounts to 25 bits. Similarly, because of ambiguities in the frame synchronization sub-system, a short period of time (about 3 bits) is allotted at the beginning of a segment so that switching transients do not include essential portions of the segments. It should be noted in FIGS. 5A and 5B, that the reference segment code word is longer than that for the station identification segment because of the critical nature of its detection. The voice channel segment shown in FIG. 5C includes a short code word to indicate the position of the beginning of the voice channel information.

Figure 6:
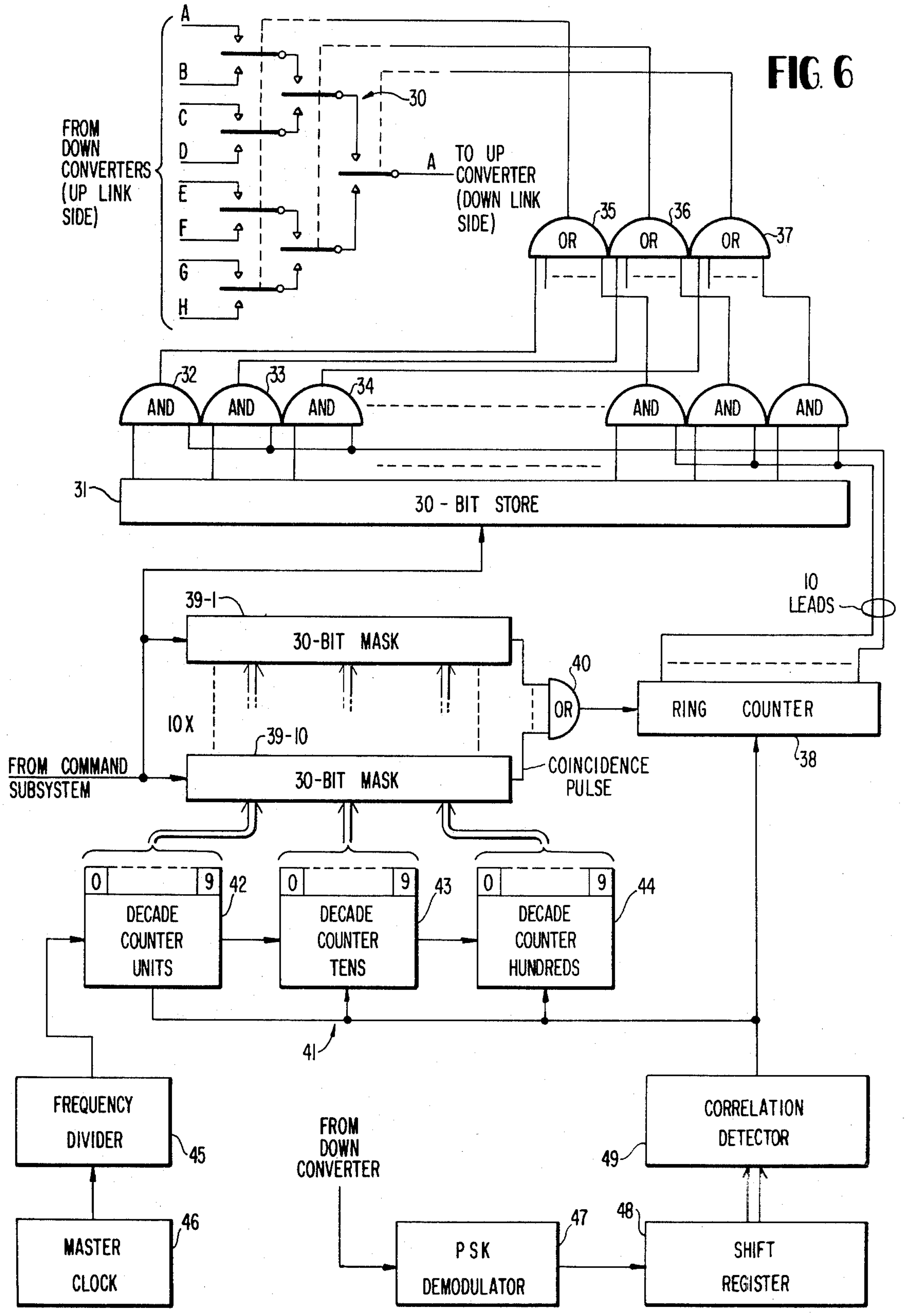
FIG. 6 is a simplified block diagram of a distribution switching system constructed in accordance with the present invention.

FIG. 6 illustrates the distribution switching subunit according to the invention. In order to achieve a truly flexible approach to the distribution of the incoming signal, the on-board distribution subunit is capable of changing both the destination grouping and the time allocations as will be explained in more detail later in this description. For purposes of this illustration, it is assumed that eight stations are each allotted 10 segments, two synchronization and eight voice channel. The eight down-converted transponder signals are routed through hierarchies of RF switches for example, well known DPST PiN switches, to the proper output amplifiers and antennas. One such switching array 30 is shown wherein the PiN switches are schematically illustrated as relay contacts. There must be eight such arrays, one for each ground station. The order in which the eight inputs to each array are routed to the output is controlled by a 30-bit store 31. This storage register 31, the contents of which can be changed by command, is logically partitioned into ten 3-bit segments. Each 3-bit segment contains the switching information for one voice channel segment. Thus, for example, the first three bits of register 31 are respectively connected to inputs of AND gates 32, 33, and 34. Each of the AND gates 32, 33, and 34 have their second inputs connected to a common gating line. AND gates 32, 33, and 34 have their outputs connected through respective inputs of OR gates 35, 36, and 37. When AND gates 32, 33, and 34 receive a gating pulse, a 3-bit code word is gated out of register 31 to OR gates 35, 36, and 37. In a similar manner, each of the ten 3-bit code words in register 31 are sequentially gated out through OR gates 35, 36, and 37. The outputs of the OR gates 35, 36, and 37 are used to control the PiN switches as indicated by the dotted lines in the Figure.

The time of the switching is controlled by a masking shift-register or ring counter 38 having 10 stages. When reset, counter 38 contains a binary 1 in its first stage and binary zeros in its remaining stages. The 10 outputs from counter 38 comprise the 10 gating lines which are connected to the 10 groups of 3 AND gates of which AND gate 32, 33, and 34 comprise one group. The shifting of the single binary 1 from the first to the succeeding stages in counter 38 serves to sequentially gate the 3-bit destination segments from the storage register 31 to the switching array 30.

The shifting of the ring counter 38 is also command-variable by means of ten 30-bit masking registers 39–1 to 39–10, each of which decodes one position of 1000 possible states. Each masking register 39–1 to 39–10 may be considered as a storage register combined with a decoding matrix such that a single pulse output is obtained when an input binary number is equal to a binary number stored in the register. The single pulse outputs from each of the registers 39–1 to 39–10 are combined in a 10 input OR gate 40 to produce the shifting pulse for the ring counter 38. Hence, the pulses appearing at the output of the OR gate 40 has a 10 pulse output corresponding to the 10 segments.

The inputs to the registers 39–1 to 39–10 are obtained from a decade counter 41 comprising a units decade 42, a tens decade 43, and a hundreds decade 44. Counter 41 receives as its input the output of frequency divider 45 which in turn receives the output of a master clock 46. It will be appreciated that as the count accumulates in counter 41, the output of the counter will sequentially match the numbers stored in each of the registers 39–1 to 39–10.

Since it is necessary for the distribution sub-unit to initialize its contents, some equipment must be provided for the subunit to synchronize on the incoming reference synchronization burst. This is accomplished by connecting the reference station's signal to the PSK demodulator 47. The demodulated signal is then passed through a shift register 48 for correlation detection of the reference synchronization code word in correlation detector 49. Correlation detector 49 may be considered as a simple decoding matrix having the synchronization code word wired in. The correlation pulse output from detector 49 then triggers the resetting of ring counter 38 and decade counter 41.

A number of alternatives are possible in the basic configuration just described. In the first place, the storage register 31, of which only one is required for the embodiment shown in FIG. 6, can be assigned on a one-per-switching-array basis thereby allowing completely independent formats for each station. It is also possible to have the synchronization reference segment generated in the satellite itself as a part of the distribution subunit. This would have the effect of exchanging the complex PSK demodulator 47 for a much simpler PSK modulator. A further variation involves the use of two or more stations per spot-beam. In this case, the stations can operate in a time division multiple access fashion with the up-link format grouped, in addition to destination, by originating station within the beam. A station may also use only one segment but have it passed through several output beams to a number of stations, rather than on a one-segment-predestination basis.

Figure 7:
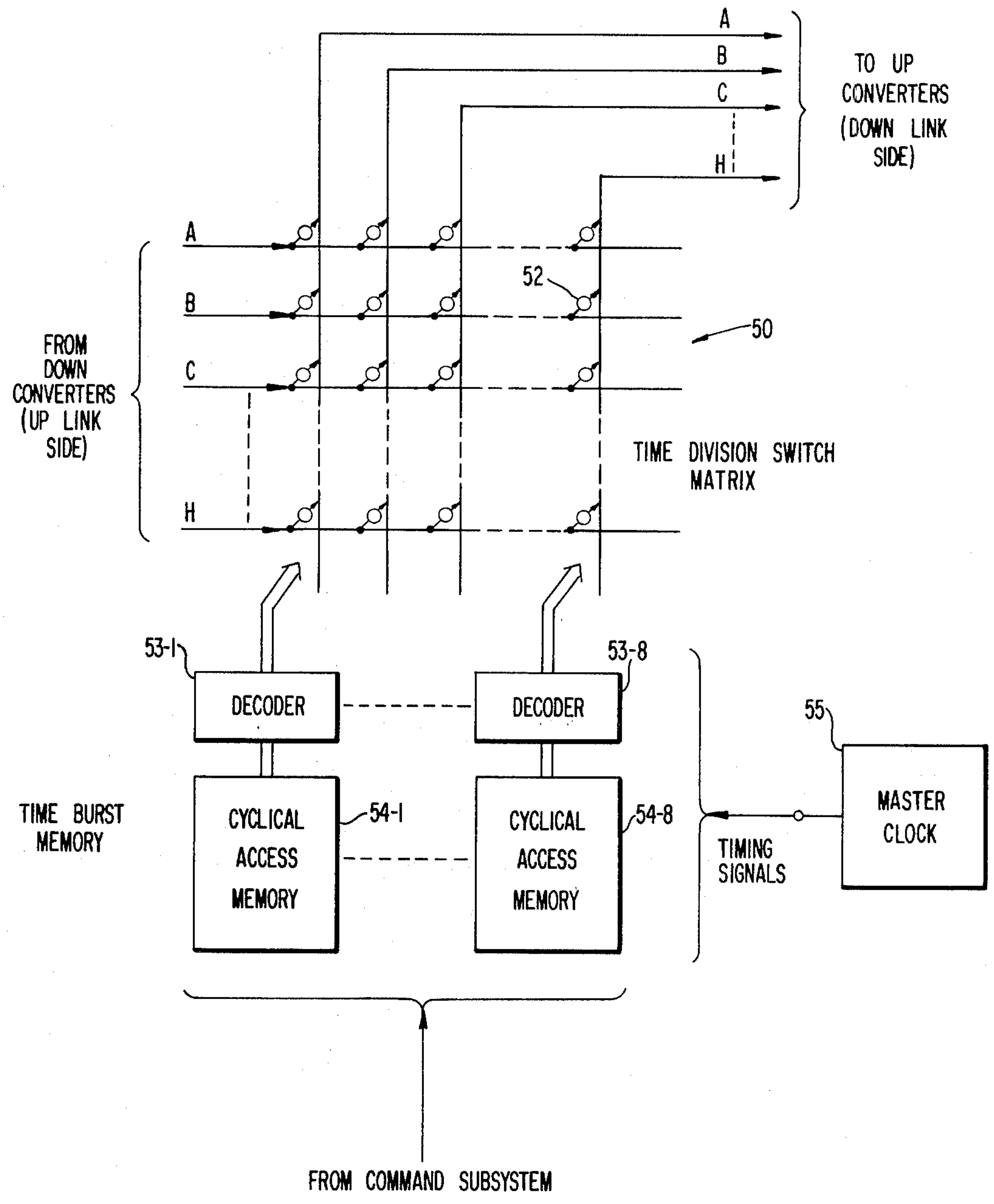
FIG. 7 is a simplified block diagram which illustrates an alternative distribution switching system.

An alternative switching system is generally shown in FIG. 7. Instead of eight switching trees 30 as shown in FIG. 6, a single 8 × 8 time division switching matrix 50 is employed. Again, it is assumed that there are eight stations. Obviously, the dimensions of the matrix will vary depending on the number of stations involved. Each circle 52 at the junctions of the matrix represents an RF switch having as one input the corresponding row line. The outputs of all of the RF switches in a single column are combined to form a single output line. The several RF switches 52 are controlled by decoders 53–1 to 53–8, one for each column of the matrix. The decoders 53–1 to 53–8 have eight output lines, each connected to a respective one of the RF switches in its particular column. Ten pulses are distributed over these eight output lines corresponding to the 10 voice channel segments. Clearly, the number of voice channel segments is purely arbitrary, 10 being taken by way of example.

Each of the decoders 53–1 to 53–8 receive the output of a cyclical access memory 54–1 to 54–8. Memories 54–1 to 54–8 may be, for example, recirculating shift registers which shift three positions in response to timing signals derived from the master clock 55. After each shift, a 3-bit code word is presented to the respective decoders 53—1 to 53–8 which uniquely defines a particular one of the RF switches in the respective columns of the matrix 50. Thus, the destination grouping is determined by the order of 3-bit codes in the respective memories 54–1 to 54–8. Time allocations of these groupings may be determined by the number of times a 3-bit code is successively repeated in the memory. Both the order of the 3-bit codes and the number of successive repetitions thereof in the memories 54–1 to 54–8 may be controlled by information derived from the satellite command subsystem.

While the description of the invention has been particularly directed to a communications satellite employing both spot-beam transmit and receive antennas, it is possible to use the invention in a communications satellite having a global receive antenna and spot-beam transmitting antennas. In such a system, the input frequency spectrum would have to be Bn as in conventional communications satellite systems. Furthermore, the several incoming signals would have to be separated by either frequency division or time division techniques. However, the outgoing bandwidth of the system would only be B. Thus, the total bandwidth of the communications satellite system would be $B(n+1)$ which results in a total system bandwidth reduction of $2n/(n+1)$. While this reduction is not nearly as great as that realized in a total spot-beam system, it is nonetheless significant.

It will be apparent that the embodiments shown are only exemplary and that various modifications can be made in construction and arrangement within the scope of the invention as defined in the appended claims.

What is claimed is:

1. In a space division communications satellite system wherein a plurality of earth stations communicate with each other via said satellite and wherein each earth station transmits, during a frame period, bursts of information in a time division multiplexed (TDM) mode destined for the other earth stations, an on-board satellite switching system comprising:

a. input means for simultaneously receiving multiple frames of TDM bursts of information from said earth stations;

b. switching means, recycled each frame period, for switchably organizing the received TDM bursts of information into a plurality of down-link frames of TDM bursts of information, wherein each down-link frame comprises groups of TDM bursts from several received frames, and;

c. output means for transmitting said down-link frames of bursts to said earth stations.

2. An on-board satellite switching system as recited in claim 1 wherein said switching means comprises a variable switch control means for altering the organization of the down-link frames from said received TDM bursts.

3. An on-board satellite switching system as recited in claim 1 wherein at least said output means comprises spot-beam transmitting antennas.

4. An on-board satellite switching system as recited in claim 3 wherein both said input and output means comprise spot-beam receiving and transmitting antennas, respectively.

5. An on-board satellite switching system as recited in claim 1 further comprising synchronization means connected to said switching means for frame synchronizing said switch control means.

6. An on-board satellite switching system as recited in claim 5 wherein said synchronization means includes detecting means on the satellite for detecting a reference synchronization code word.

7. An on-board satellite switching system as recited in claim 1 wherein said switching means comprises a plurality of solid-state switching equal in number to the number of simultaneously received frames each of said switching trees having an input for each received frame and a single output for a respective one of the down-link frames.

8. An on-board satellite switching system as recited in claim 7 wherein said switching means further comprises:

a. a storage register having a plurality of code words stored therein, each code word uniquely defining an input to output path in said switching trees, and
b. masking means connected to said storage register for selectively gating said code words to said switching trees.

9. An on-board satellite switching system as recited in claim 8 wherein said masking means comprises:

a. a ring counter,
b. gating means connected to said storage register and controlled by said ring counter for selectively gating out said code words,
c. a plurality of masking registers the outputs of which are connected to said ring counter to control the shifting of the contents thereof, and
d. an accumulating counter having its output connected to each of said masking registers, said masking registers producing outputs when their respective contents equal the accumulated count in said accumulating counter.

10. An on-board satellite communications switching system as recited in claim 9 wherein the contents of said storage register and said masking registers are variable to permit the alteration of the organization of said down-link frames from said received bursts and the alteration of the times of switching.

11. An on-board satellite switching system as recited in claim 9 further comprising synchronization means connected to said ring counter and to said accumulating counter for frame synchronizing said switch control means.

12. An on-board satellite switching system as recited in claim 11 wherein said synchronization means includes detecting means on the satellite for detecting a reference synchronization code word, said detecting means producing a reset pulse for said ring counter and said accumulating counter.

13. An on-board satellite switching system as recited in claim 9 wherein at least said output means comprises spot-beam transmitting antennas.

14. An on-board satellite switching system as recited in claim 13 wherein both of said input and output means comprise spot-beam receiving and transmitting antennas, respectively.

15. An on-board satellite switching system as recited in claim 1 wherein said switching means comprises a rectangular switch matrix having a plurality of inputs equal in number to the number of simultaneously received frames and a plurality of outputs equal in number to the number of down-link frames.

16. An on-board satellite switching system as recited in claim 15 wherein said switch matrix includes a plurality of AND gates located at respective ones of the junctions of said matrix, one input of each of said AND gates in a single row being connected to a single one of said plurality of inputs to said matrix and the outputs of each of said AND gates in a single column being connected to a single one of said plurality of outputs of said matrix.

17. An on-board satellite switching system as recited in claim 16 wherein said switching means further comprises:

a. a plurality of cyclical access memories equal in number to the number of columns in said matrix, each of said memories storing a plurality of multibit code words which uniquely define a single AND gate in a respective column of said matrix, and
b. a plurality of decoders each of which is connected to a respective one of said memories and has a number of outputs equal to the number of AND gates in its respective column of said matrix, said decoders being connected to said AND gates to selectively enable said AND gates under the control of said code words.

18. An on-board satellite switching system as recited in claim 17 wherein said cyclical access memories define the time of switching the received bursts into the down-link frames by the successive repetition of said code words stored therein.

19. An on-board satellite switching system as recited in claim 18 wherein the contents of said cyclical access memories are variable to permit the altering of the organization of bursts in said down-link frames and the time of switching.

20. An on-board satellite switching system as recited in claim 19 wherein at least said output means comprises spot-beam transmitting antennas.

21. An on-board satellite switching system as recited in claim 20 wherein both said input and output means comprises spot-beam receiving and transmitting antennas, respectively.

22. A satellite communications repeater system for relaying communications signals between multiple distant stations, wherein at least all but one distant station in communication with said satellite transmits a station identification signal periodically, said period being the communications system frame period, said repeater system comprising:

a. means for separately and simultaneously receiving the up-link signals from all said distant stations in communication with said satellite;
b. plural transmitter means for separately and simultaneously transmitting down-link signals to said distant stations;
c. switching network means responsive to a periodically occurring frame reference signal for interconnecting said receive and transmitter means for a fixed duration a predetermined time after occurrence of said frame reference signal so that the up-link signal from each said station becomes the down-link signal to the same respective station for said duration, said duration being substantially equal in time to said station identifying signals, whereby each station, when properly frame synchronized, will receive its own station identifying signal.

23. A satellite communications repeater system as claimed in claim 22 wherein said switching network means further comprises means for connecting said frame reference signal to said plural transmitter means for inclusion in all said down-link signals.

24. A satellite communications repeater system as claimed in claim 23 wherein said periodically occurring frame reference signal emanates from one of said earth stations and is transmitted to said satellite repeater in the up-link signals of said one earth station.

* * * * *